Figure 1:
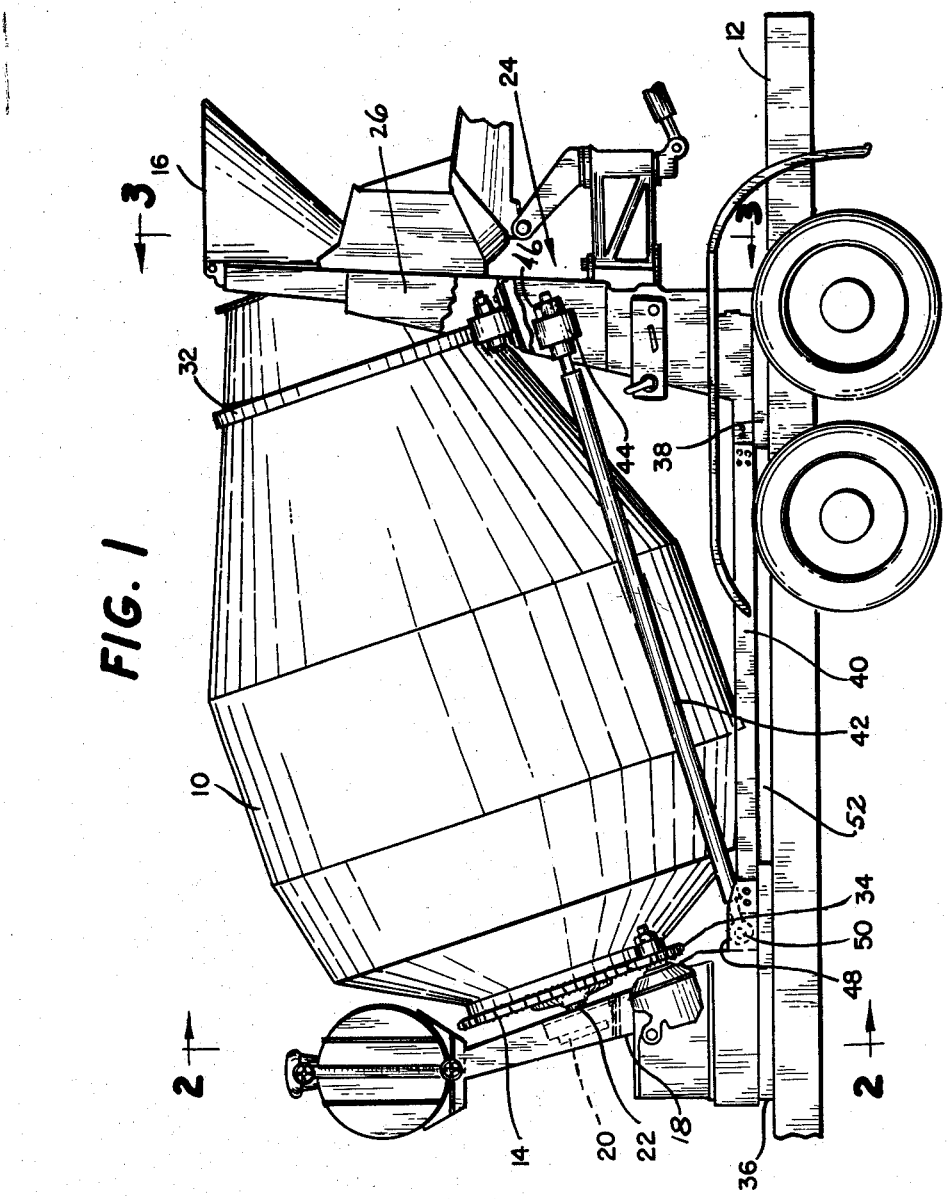

March 19, 1963 L. E. BROBERG 3,081,982
MIXER DRUM SUPPORT STRUCTURE FOR TRUCK CONCRETE MIXER
Filed Nov. 14, 1960 2 Sheets-Sheet 2

INVENTOR.
Leonard E. Broberg
BY John W. Michael
Attorney

United States Patent Office
3,081,982
Patented Mar. 19, 1963

3,081,982
MIXER DRUM SUPPORT STRUCTURE FOR
TRUCK CONCRETE MIXER
Leonard E. Broberg, Milwaukee, Wis., assignor to The
T. L. Smith Company, Milwaukee, Wis., a corporation of Wisconsin
Filed Nov. 14, 1960, Ser. No. 68,982
2 Claims. (Cl. 259—176)

This invention relates to truck-type concrete mixers and particularly to an improved support arrangement for the mixer drum.

Due to the rough roads and uneven terrain over which truck mixers are often driven, the truck chassis must be constructed to permit a degree of deflection. A rigid frame braced against deflection would prevent the chassis from adjusting itself properly and would cause severe structural strains to occur.

One of the problems created by the deflection of the truck chassis is the difficulty in maintaining proper alignment of the main front bearing and rear rollers for the mixer drum. This problem is of particular significance when it is realized that the mixer drum is rotated in transit thereby subjecting the drum support structure and bearings to the deflection forces mentioned above while such bearings are in use.

The principal object of this invention is to provide a support arrangement for a transit mixer which will maintain the proper mixer drum bearing alignment without unduly restricting the freedom of the support structure to deflect in response to the stresses experienced in transit.

Another object is to provide such an arrangement which is of a relatively simple design and does not increase either the cost or weight of the equipment to any appreciable extent.

The objects of this invention are attained by a support structure which includes a truck chassis having a front pedestal for mounting a main bearing and a rear support structure for mounting a pair of spaced drum rollers. The mixer drum is rotatably mounted in said main bearing and on said drum rollers in a conventional manner. The proper alignment of the main front bearing and drum rollers is maintained by a pair of stabilizer bars fastened to the bearing support structure on either side of the mixer drum. The rear ends of the stabilizer bars are fastened to the rear support structure at points closely adjacent the drum rollers. The front ends of the stabilizer bars are anchored at points closely adjacent the base of the front pedestal. The stabilizer bars mounted as described above provide the required support for the pedestal and rear support structure to maintain proper bearing alignment without unduly restricting the freedom of the chassis to deflect in response to stresses experienced in transit.

Figure 2:
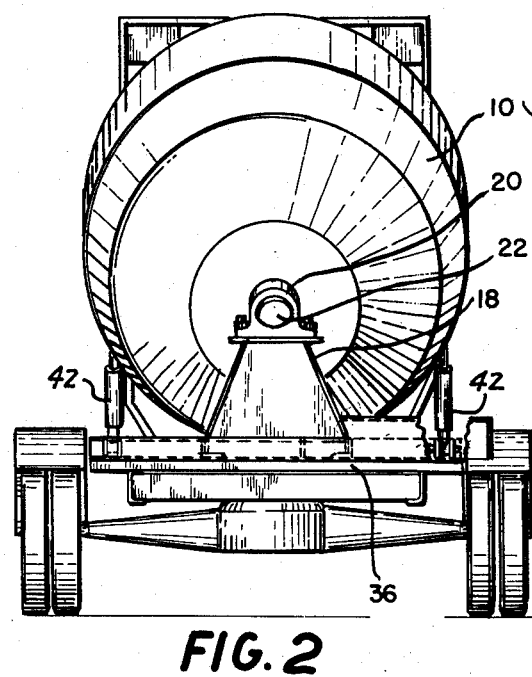
Figure 3:
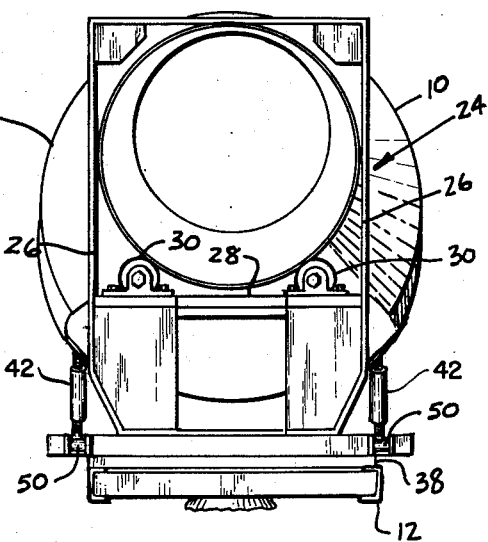
Figure 4:
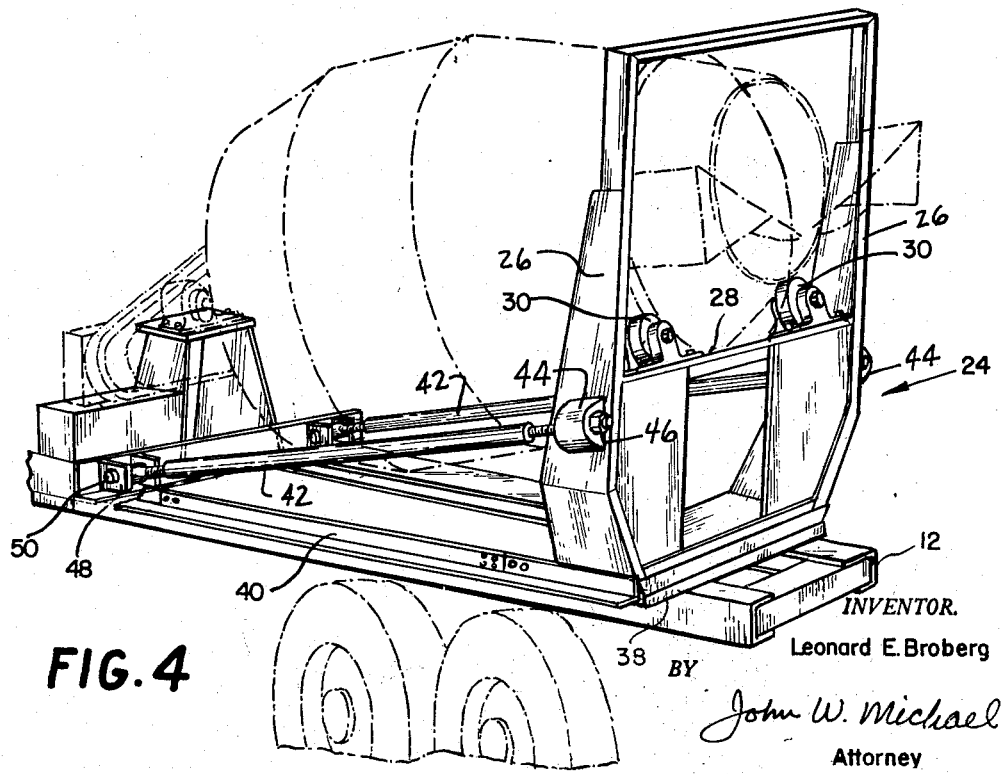

Other objects and advantages will be pointed out in, or be apparent from the specification and claims, as will obvious modifications of the single embodiment shown in the drawings, in which:

FIG. 1 is a side elevation view of the rear portion of a truck-type concrete mixer embodying the present invention;

FIGS. 2 and 3 are vertical sectional views taken along lines 2—2 and 3—3 of FIG. 1, respectively; and FIG. 4 is a fragmentary perspective view of the truck mixer shown in FIG. 1.

Referring to the drawings in detail, FIG. 1 shows the rear mixer portion of a truck-type concrete mixer which includes a mixer drum 10 rotatably mounted on the chassis 12 of the truck. The front end of the drum is closed by a head 14 and the rear end is open to permit charging and discharging the drum by means of a chute 16.

The drum 10 is supported on chassis 12 for rotation on an inclined axis in a conventional manner. The front end of the drum is supported on a pedestal 18 by a main bearing 20 in which a shaft 22 on drum head 14 journaled. The rear end of the drum is supported on a supporting structure indicated generally by the numeral 24. Support structure 24 includes a pair of vertical side members 26 and a horizontal cross support 28 on which a pair of drum rollers 30 are mounted. Drum 10 is rotatably supported on rollers 30 by means of a roller track 32 mounted on the exterior of the drum. The drum is rotated in a conventional manner by a chain drive 34 at the front end of the drum.

Pedestal 18 and rear support 24 are mounted on pads 36 and 38, respectively, fastened to chassis 12 and the front pedestal and rear support may be tied together by angles 40 as shown.

With the above described support arrangement for drum 10, it will be noted that chassis 12 is free to deflect in response to stresses received as the truck is driven over rough roads. It will be appreciated, however, that deflection of chassis 12 will cause movement of support 24 and pedestal 18 towards and away from each other which, in turn, will cause misalignment of the bearing 20 and drum rollers 30 mounted on the pedestal and support, respectively.

To maintain alignment of the bearing and drum roller without unduly restricting the freedom of the chassis to deflect in response to operational stresses, a pair of stabilizer bars 42, 42 are provided. The arrangement of bars 42 with respect to the support structure is of critical importance. It is essential in this respect that bars 42 be fastened between the front and rear bearing supports at points as close to the bearings as is practicable. Thus, as shown in the drawings, the rear ends of bars 42 are fastened to the vertical side members 26 of support structure 24 by lugs 44 and nuts 46 located at points closely adjacent drum rollers 30.

The anchoring locations for the front ends of bars 42 poses a somewhat more difficult problem. Due to the space occupied by other essential equipment and the diameter of the drum, bars 42 are fastened at the base of pedestal 18 by lugs 48 and 50 as shown. This arrangement, although not the ultimate in respect to maintaining bearing alignment, serves to accomplish the desired result without necessitating any major redesign of a conventional truck mixer.

With stabilizer bars 42 mounted as described above, it will be appreciated that when chassis 12 is deflected upwardly between the bearing supports, for example, the bars will restrain any tendency of pedestal 18 and rear roller support 24 to tilt away from each other and thereby cause misalignment of the bearing 20 and rollers 30 as would otherwise result. It will also be noted that while the relative positions of pedestal 18 and rear roller support 24 are maintained by bars 42, chassis 12 remains substantially free to deflect in response to operational stresses. As shown in FIG. 1, pads 36 and 38 do not run the full length of the machine leaving a space 52 between the frame 12 and angles 40 into which the frame can deflect.

Although but a single embodiment of the present invention has been illustrated and described, it will be apparent to those skilled in the art that various changes and modifications may be made therein without departing from the spirit of the invention or from the scope of the appended claims.

I claim:
1. Support structure for the mixer drum of a truck-type concrete mixer comprising, a truck chassis being flexible from end to end, front and rear bearing supports mounted on said chassis, a main bearing mounted on said front bearing support, a plurality of spaced drum rollers mounted on said rear bearing support, a mixer drum rotatably mounted in said main bearing and on said drum rollers, and a pair of stabilizer bars for maintaining alignment of said main bearing and drum rollers, said stabilizer bars being fastened at one end to said rear bearing support at points adjacent said drum rollers, said bars being fastened at the other end at the base of said front bearing support.

2. Support structure for the mixer drum of a truck-type concrete mixer comprising, a truck chassis being flexible from end to end, a front pedestal, a main bearing mounted on said front pedestal, a rear roller support including a pair of vertical side members and a horizontal cross support, a plurality of spaced drum rollers mounted on the horizontal cross support of said rear roller support, a mixer drum rotatably mounted in said main bearing and on said drum rollers, and a pair of stabilizer bars for maintaining alignment of said main bearing and drum rollers, said stabilizer bars being fastened at one end to said pair of vertical side members of said rear roller support at points adjacent said drum rollers, said stabilizer bars being fastened at the other end at points adjacent the base of said front pedestal.

References Cited in the file of this patent

UNITED STATES PATENTS

| | | |
|---|---|---|
| 1,475,904 | Vandenplas | Nov. 27, 1923 |
| 2,350,285 | Maxon | May 30, 1944 |
| 2,563,336 | Jaeger | Aug. 7, 1951 |
| 2,722,408 | Hilkemeier | Nov. 1, 1955 |